United States Patent [19]

Hotton et al.

[11] Patent Number: 5,345,661
[45] Date of Patent: Sep. 13, 1994

[54] SEAT SKINNING AND METHOD

[75] Inventors: Donald J. Hotton, Rochester Hills; Sherry A. Broad, Sterling Heights, both of Mich.

[73] Assignee: General Motors Corporation, Detroit, Mich.

[21] Appl. No.: 56,269

[22] Filed: May 3, 1993

[51] Int. Cl.⁵ .................................................. B68G 7/00
[52] U.S. Cl. ...................................... 29/91.1; 29/91.2; 29/91.5; 29/448
[58] Field of Search ........................ 29/91.1, 91.5, 448, 29/DIG. 35, 91.2; 53/574

[56] References Cited

U.S. PATENT DOCUMENTS

| 568,648 | 9/1896 | White. | |
|---|---|---|---|
| 1,370,690 | 3/1921 | Jacobs | 29/91.1 X |
| 2,693,304 | 11/1954 | Davis et al. | 226/18 |
| 2,749,690 | 6/1956 | Bridges et al. | 53/125 |
| 2,907,156 | 10/1959 | Anderson | 53/124 |
| 3,161,003 | 12/1964 | Grintz | 53/255 |
| 3,270,485 | 9/1966 | Knepper | 53/255 |
| 3,438,108 | 4/1969 | Nash | 29/91.5 |
| 3,660,964 | 5/1972 | Willis et al. | 53/125 |
| 3,669,498 | 6/1972 | Meyers et al. | 297/452 |
| 4,300,327 | 11/1981 | Bridger | 53/258 |
| 4,385,427 | 5/1983 | Fraiser | 29/91.5 |
| 4,557,522 | 12/1985 | Isikawa | 297/452 |
| 4,665,606 | 5/1987 | Saito et al. | 29/448 |
| 4,679,379 | 7/1987 | Cassoli | 53/438 |
| 4,711,067 | 12/1987 | Magni | 53/439 |
| 4,813,740 | 3/1989 | Yon et al. | 297/219 |
| 4,837,905 | 6/1989 | Sullivan et al. | 29/91.5 |
| 4,845,925 | 7/1989 | Thompson | 53/438 |
| 4,860,415 | 8/1989 | Witzke | 29/91.1 |

Primary Examiner—Timothy V. Eley
Assistant Examiner—Khan V. Nguyen
Attorney, Agent, or Firm—Ernest E. Helms

[57] ABSTRACT

A seat skinning mechanism for skinning a flexible membrane cover on a polymeric foam vehicle seat body is provided which, in a preferred embodiment, includes a first support surface for positioning the seat body located generally underneath the seat body, a second support surface contacting the seat body on a first vertical side of a seat body, first and second powered wings pivotally mounted with respect to the second support surface, the wings causing the lateral edges of the seat body to fold upon themselves to an extent to allow the flexible membrane cover to be placed over the foam body, the second support surface and the wings, and a lift to force the foam body upward, removing the seat body from between the second support surface and the wings with the membrane cover or the seat body.

1 Claim, 6 Drawing Sheets

SEAT SKINNING AND METHOD

FIELD OF THE INVENTION

The field of the present invention is that of an apparatus and a method of utilization thereof of a vehicle seat skinner. More particularly, the present invention refers to seat skinners which put on a membrane cover such as leather, vinyl or plastic on a polymeric foam vehicle seat body.

DISCLOSURE STATEMENT

Many vehicle seat backs, especially bucket-type seats, have a metal frame member which is covered with a polymeric foam. Covering the polymeric foam in a pillow-type fashion is a membrane such as leather, vinyl or fabric. The volume of the membrane cover is smaller than the volume of the polymeric foam in a free state to insure a seat with the best appearance. Therefore, to place the cover on tim foam body there must be some means to compress the foam. The primary method of accomplishing the above is a mechanism which has two plates, commonly referred to as a clamshell. The foam body is captured between the plates. One of the plates is movable by a piston. Once the clamshell has closed upon the foam body, the cover is put over the clamshell, and a pop-up cylinder pushes the foam body from the clamshell, causing the foam body to be located within the cover.

There are several reasons why the clamshell is undesirable. The first reason is that even when compressed, pulling the cover down over the foam body is a strenuous operation and has been found to be taxing to workers. In instances where a seat has lateral support wings, it has been found that two strong workers are required. Another problem which came about in instances where the lateral support wings were utilized is that with the lateral support wings, there is typically imposed within the foam a wire to aid in retention of the shape of the foam body. This wire was previously found often to be compressed and damaged by the clamshell-type fixture.

To overcome the above-noted problem, the present invention is brought forth. The present invention provides a seat skinner having a support back and also having pivotally mounted with respect thereto two compressing wings. The wings in operation laterally fold over the lateral edges of the seat upon itself, allowing an assembly operator to put on the membrane cover over the seat body. Additionally, a pop-up cylinder is provided to remove the foam body from the skinning mechanism. The seat skinner of the present invention accomplishes the above task without damage to wire preforms encapsulated within the seat body.

DESCRIPTION OF THE PREFERRED EMBODIMENTS

Figure 1:
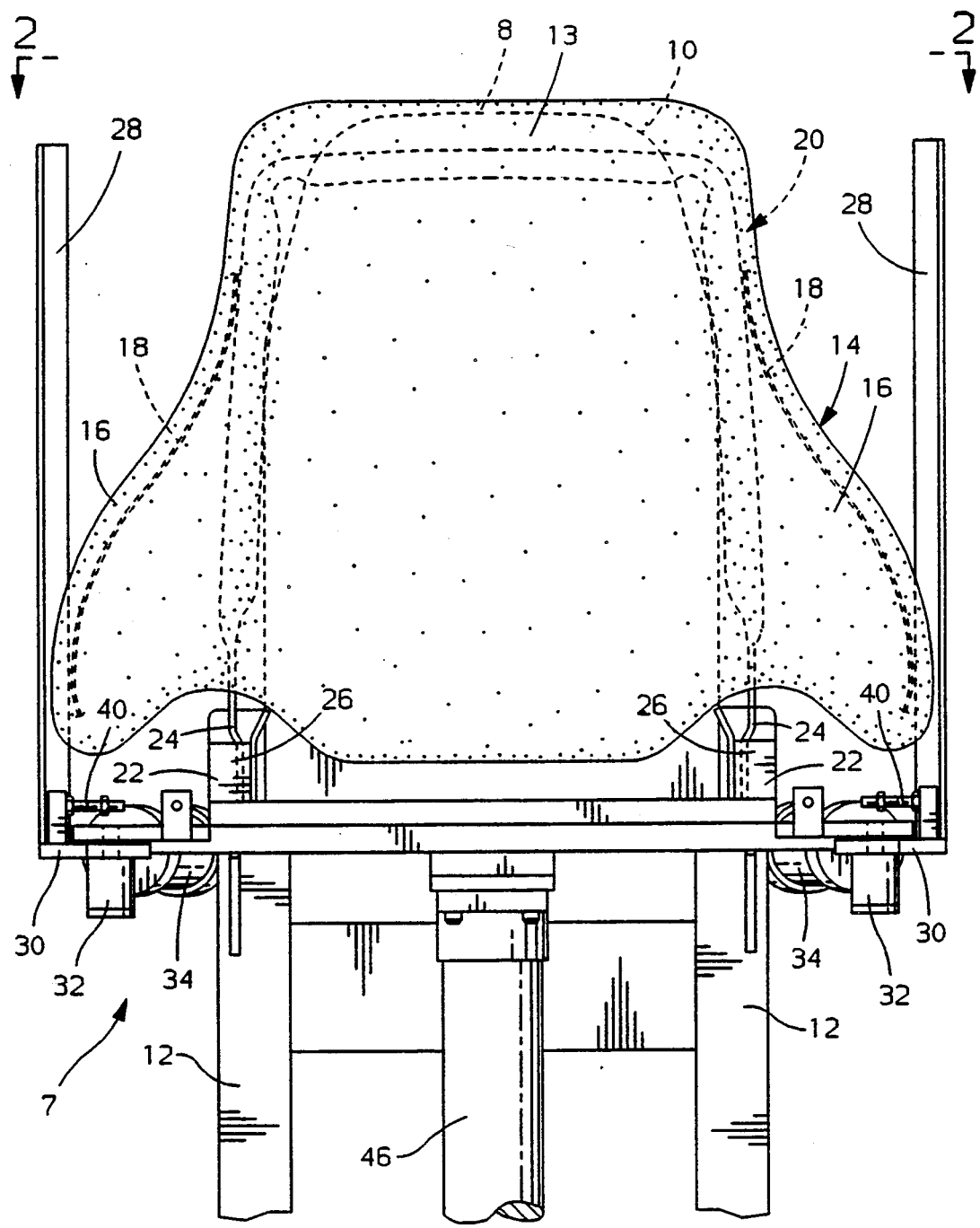
FIG. 1 is a front elevational view of a preferred embodiment seat skinning mechanism according to the the present invention.
Figure 2:
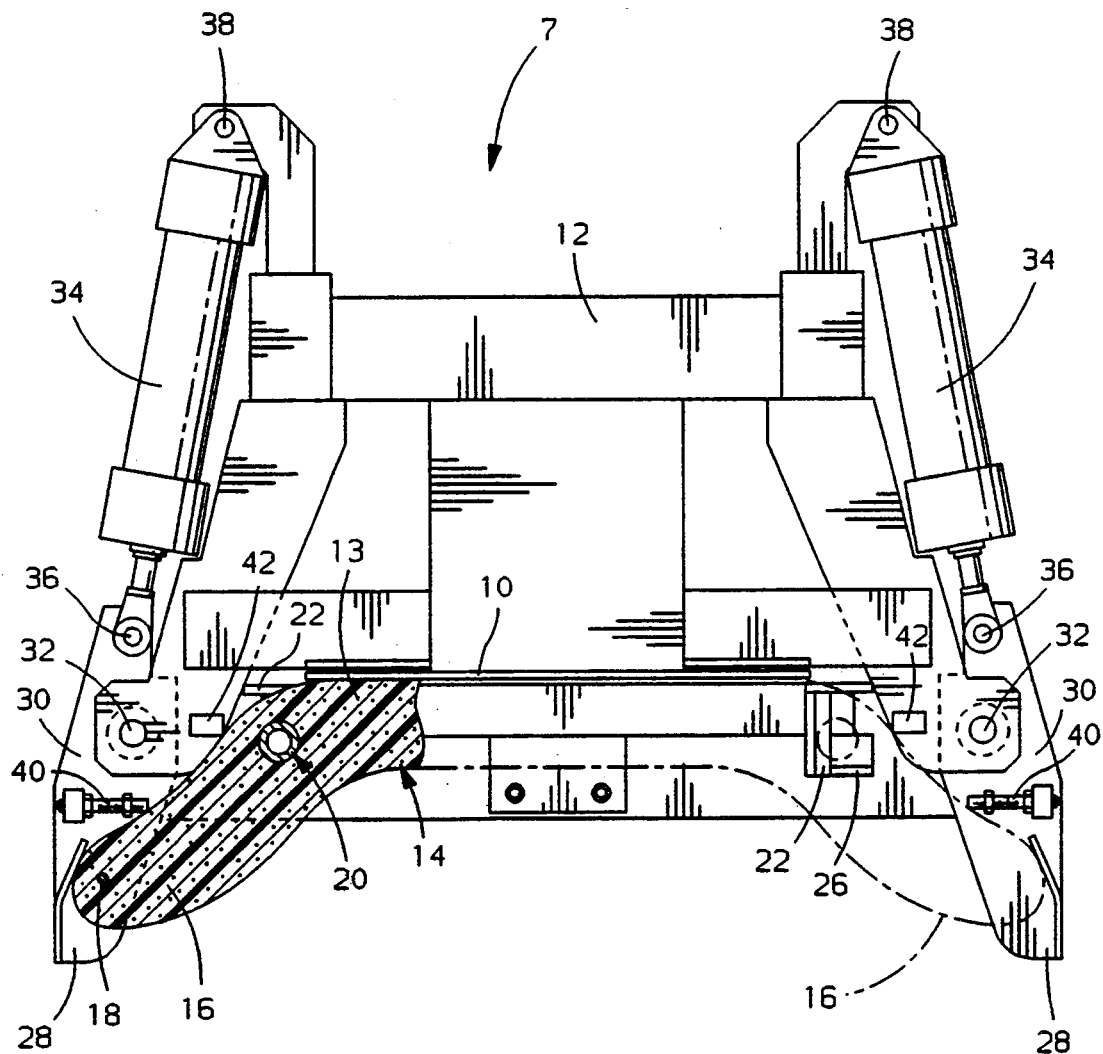
FIG. 2 is a view taken along line 2—2 of FIG. 1.

Referring to FIGS. 1 and 2, the seat skinner 7 has a frame support 12. Fixably joined to the frame support 12 is a second support surface or back 10 which projects generally vertically. The back 10 provides a second support surface which supports a rear side 13 of a vehicle seat polymeric foam body 14. The foam body 14 shown has two lateral support sections 16. Each lateral support 16 has a reinforcing wire 18 which is about three-quarters of an inch inside the foam of the foam body 14.

Also embedded within the foam body 14 is a frame 20 which is mainly tubular except at its extreme ends 24 where it rests on a first support 22 which not only holds the foam body 14 vertically but also restrains it from forward motion by its side 26 which captures end 24 of the seat body frame 20.

Pivotally mounted with respect to the frame 12 are two wings 28. The wings 28 project vertically upward from pivot arms 30 which are pivotally connected with the frame 12 along a pin 32. To power each arm is an appropriate fluidly-powered cylinder 34 having a pivotal point of attachment 36 with the length 30 and a pivotal point of attachment 38 with the frame 12. An adjustable set screw 40 in combination with a stop 42 is provided to adjustably limit the angular orientation of the wing 28 when it is desired that the cylinder 34 be fully extended. The wing 28 is provided with a tailored angle or curvature to ideally mate it with the foam body 14 provided.

Figure 3:
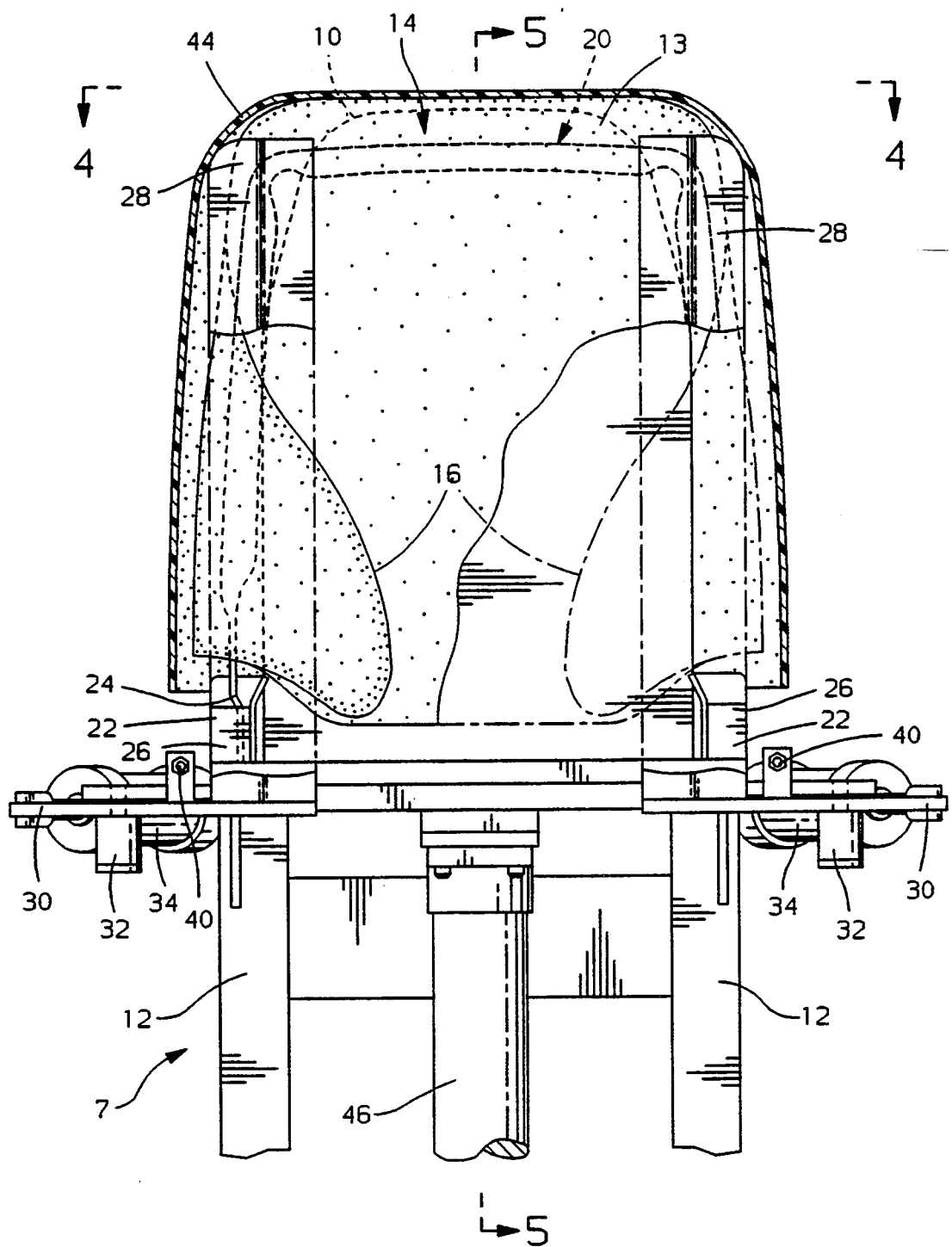
FIG. 3 is a view similar to FIG. 1 illustrating the operation of the seat skinner according to the present invention.
Figure 4:
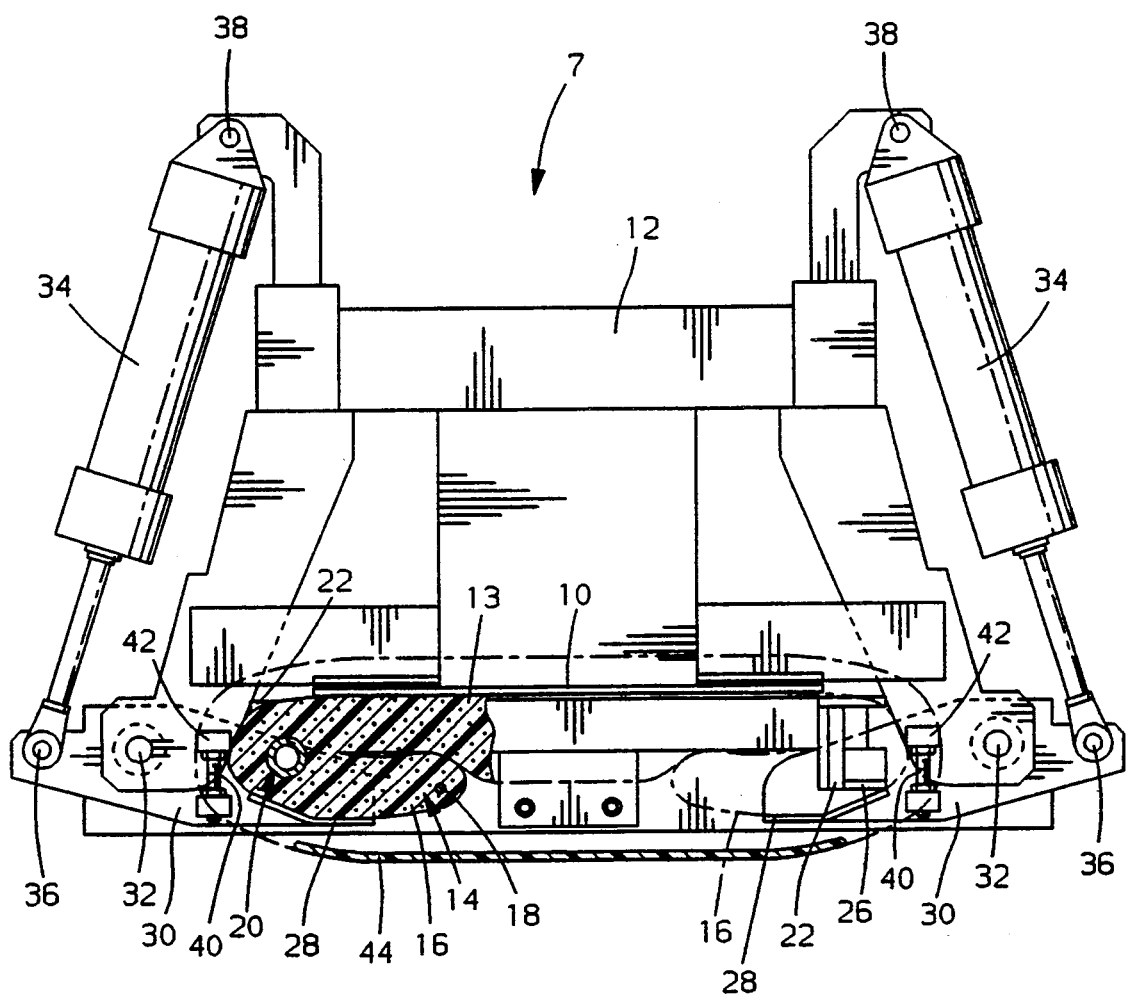
FIGS. 4 and 5 are views taken along lines 4—4 and 5—5, respectively, of FIG. 3.
Figure 5:
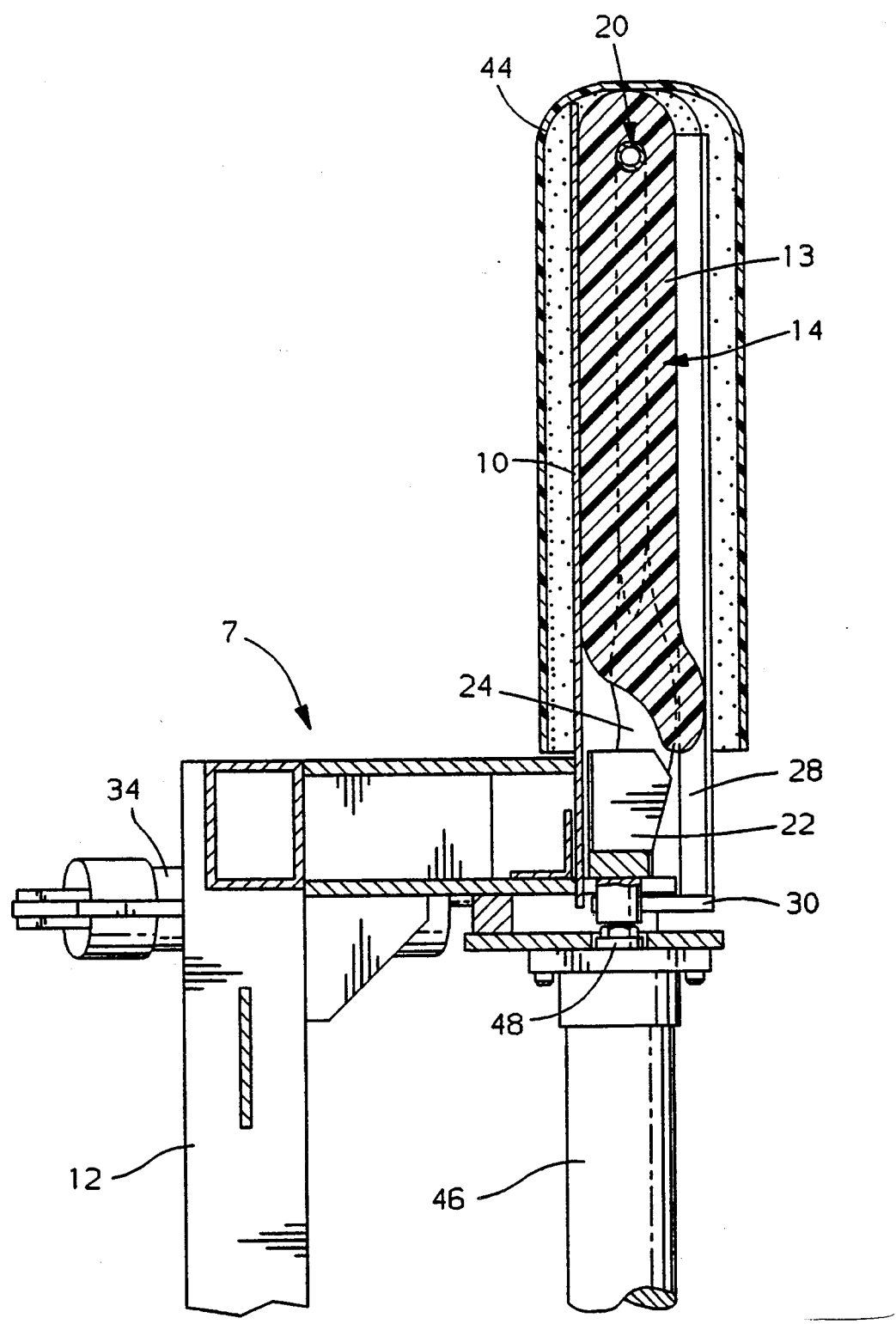
Figure 6:
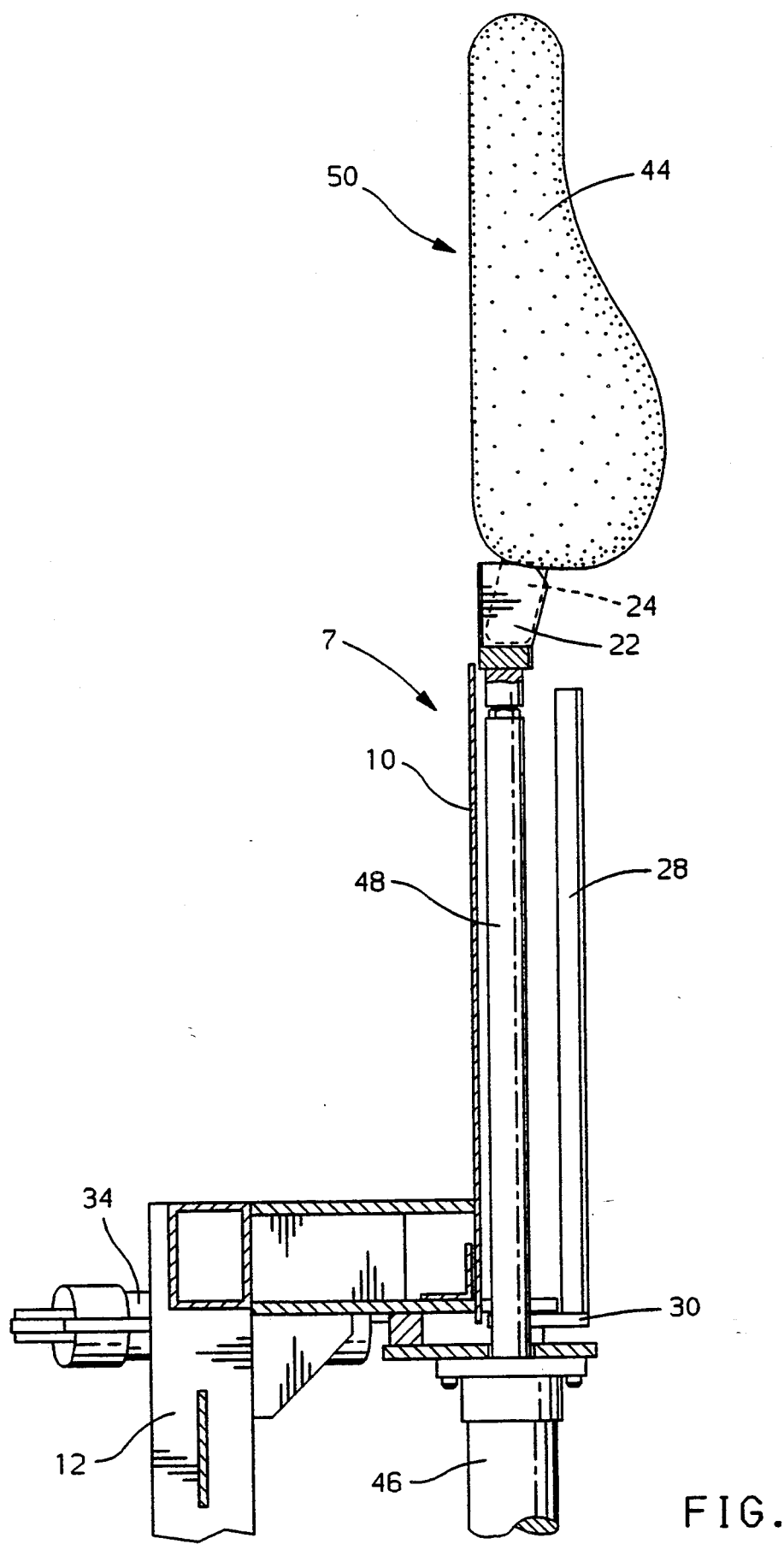
FIG. 6 is a view similar to FIG. 5 illustrating the operation of the present invention during the last stages of operation.

In operation, referring to FIGS. 1 and 2, the foam body 14 will be located on the first support surfaces provided by the brackets 26 by virtue of its extended portion 24 of its embedded frame 20. The rear side 13 of the seat body will be supported by the backing plate 10. Upon the utilization of controls by the machine operator, the wings 28 which first are adjacent to a rear edge of the foam body 14 as shown in FIG. 2 will come in contact with the lateral edges of the two lumbar sections 16 of the foam body 14, bending them over on themselves as best shown in FIGS. 3 and 4. The wings 28 are configured in such a manner that they will not damage the embedded wire 18 and the foam body 14. The foam body 14 will not have a tendency to push forward since it is restrained within retainers 22. At this point, the polymeric foam body 14 will be compressed, and the membrane cover 44 will be placed over the foam body 14 and also the corresponding back plate 10. (Angel hair may optionally be used to ease the placement of the membrane cover 44.) This is a fairly simple and easy operation since the foam body 14 is so compressed. Upon placement of the flexible membrane cover 44 on the foam body 14, the operator by appropriate means will signal the fluid power cylinder 46 which has an extension piston rod 48 which has connected thereto the bracket supports 22. As the extension piston 48 moves upward (FIG. 6), outward movement of the wings 28 from the position of the wings 28 shown in FIGS. 4 and 5 will be resisted by the force provided by pistons 34. As the foam body 14 is ejected above the back support 10 and the wings 28, it will be encased within the cover 44, forming completed seat assembly 50. (Usually, the assembly operator will hold down the membrane cover 44.) The seat assembly 50 will then be taken to another fixture where the close-out operation on the cover 44 will be accomplished.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A method of skinning a flexible membrane cover on a polymeric foam vehicle seat body having lumbar sections comprising:

supporting the seat body underneath the seat body on a first support surface;

supporting the seat body on a first vertical side of the seat body along a vertical second support surface;

compressing the seat body against the second support surface by moving first and second wings which are pivotally mounted with respect to the second support surface, compressing the lumbar sections of the seat body over themselves to a point to allow a flexible membrane cover to be placed over the seat body, the second support surface and the wings; and ejecting the seat body upward, allowing the seat body to then fill up the flexible membrane cover.

* * * * *